United States Patent [19]
Sheaffer et al.

[11] Patent Number: 5,938,983
[45] Date of Patent: Aug. 17, 1999

[54] AERATION DEVICE

[76] Inventors: Ronald C. Sheaffer, 303 N. Main St., Sandwich, Ill. 60548; John R. Sheaffer, II, 1017 Pine St., St. Charles, Ill. 60174; Mark D. Sheaffer, 303 N. Main St., Sandwich, Ill. 60548

[21] Appl. No.: 08/989,808

[22] Filed: Dec. 12, 1997

[51] Int. Cl.⁶ ........................................................ B01F 3/04
[52] U.S. Cl. .................. 261/122.1; 210/199; 210/221.2; 261/122.2; 261/124
[58] Field of Search ............................. 261/121.1, 122.1, 261/122.2, 124; 210/758, 199, 220, 221.2

[56] References Cited

U.S. PATENT DOCUMENTS

| | | | |
|---|---|---|---|
| 1,753,081 | 4/1930 | Derossi | 261/124 |
| 1,759,735 | 5/1930 | Derossi | 261/124 |
| 3,470,091 | 9/1969 | Budd et al. . | |
| 3,502,213 | 3/1970 | Kuribayashi . | |
| 3,505,213 | 4/1970 | Anthony et al. . | |
| 3,528,911 | 9/1970 | Bowes . | |
| 3,671,022 | 6/1972 | Laird et al. . | |
| 3,897,334 | 7/1975 | Murphy . | |
| 3,988,396 | 10/1976 | Stannard | 261/124 |
| 4,039,439 | 8/1977 | Clark . | |
| 4,152,259 | 5/1979 | Molvar . | |
| 4,226,719 | 10/1980 | Woltman . | |
| 4,279,537 | 7/1981 | Tweedy . | |
| 4,308,138 | 12/1981 | Woltman . | |
| 4,347,143 | 8/1982 | Righetti . | |
| 4,494,616 | 1/1985 | McKee . | |
| 4,507,206 | 3/1985 | Hughes . | |
| 4,622,139 | 11/1986 | Brown . | |
| 4,655,242 | 4/1987 | Hamazaki et al. | 261/124 |
| 4,663,089 | 5/1987 | Lowry et al. . | |
| 4,732,682 | 3/1988 | Rymal . | |
| 4,749,493 | 6/1988 | Hicks . | |
| 4,780,217 | 10/1988 | Petersen . | |
| 4,828,696 | 5/1989 | Makino et al. . | |
| 4,849,101 | 7/1989 | Desjardins . | |
| 4,906,359 | 3/1990 | Cox, Jr. . | |
| 5,227,067 | 7/1993 | Runyon . | |
| 5,256,309 | 10/1993 | Makino . | |
| 5,507,950 | 4/1996 | Senda et al. . | |
| 5,549,828 | 8/1996 | Ehrlich . | |

OTHER PUBLICATIONS

We Clean Dirty Lakes, by Ronald C. Sheaffer Fall 1996 (before Dec. 1996).

*Primary Examiner*—C. Scott Bushey
*Attorney, Agent, or Firm*—Bernstein & Assoc. P.C.

[57] ABSTRACT

A bubble diffusion aerator mounted onto a "pot" aerator, for oxygenating a body of water. The bubble diffusion aerator comprises spiral coils of perforated flexible tubing mounted onto a flat frame, with a single air feed line connected to the tubing at a point equidistant from the tubing ends for uniform air pressure. The frame has openings to provide a continuous flow of oxygen-deficient water across the coiled tubing. The "pot" aerator has a vertical pipe with an air feed line, with the vertical pipe mounted on a base. The diffusion aerator is mounted to the vertical pipe of the "pot" aerator at a position up off the water body bottom, minimizing air hole clogging and bottom sediment disturbance. Each aerator has a separate air feed line connected to an air compressor on shore. The aerators can be operated independently, running only the diffusion aerator for air/water transfer, running only the pot aerator to create water movement, or running both to maximize the benefits of each aerator. A vertical pipe, without an aerator feed line, may be provided to support the diffuser aerator at an elevated position where a "pot" aerator is not required.

20 Claims, 2 Drawing Sheets

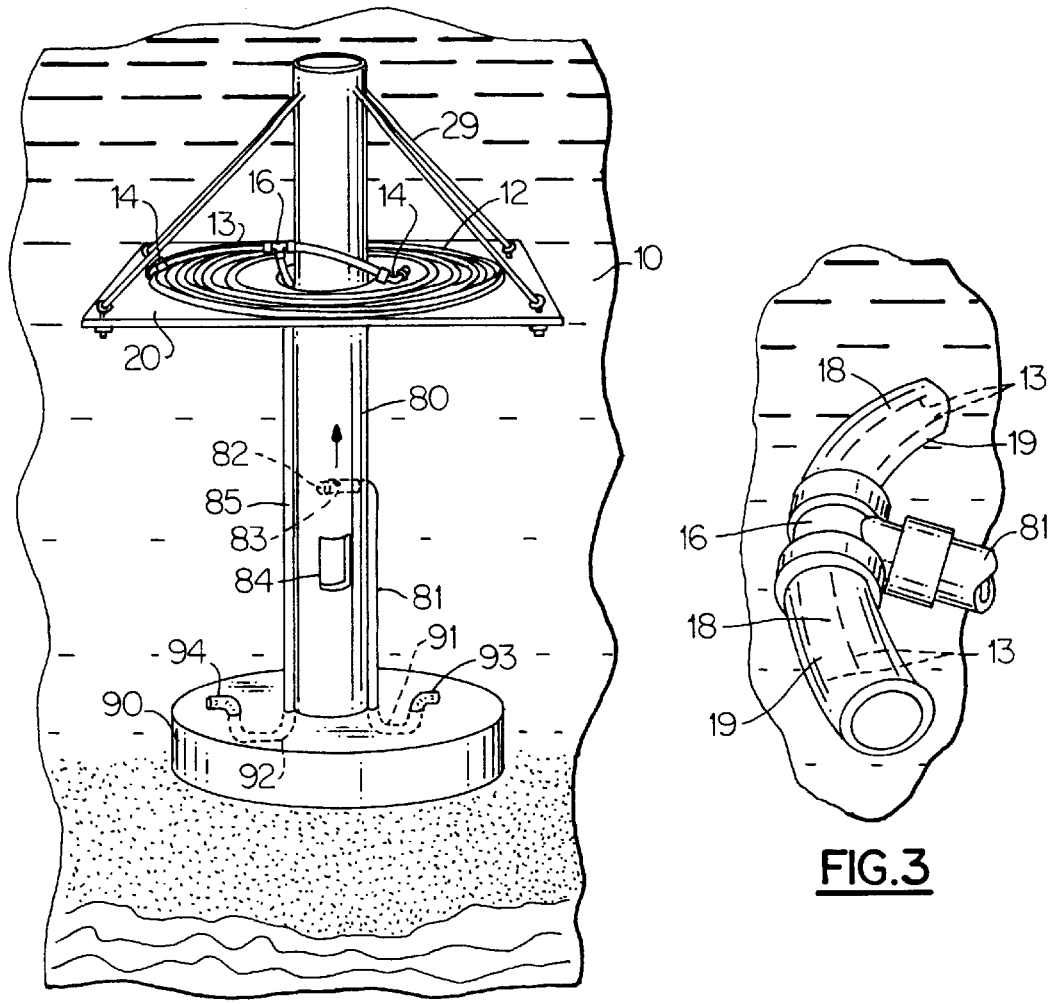
FIG.1
FIG.3
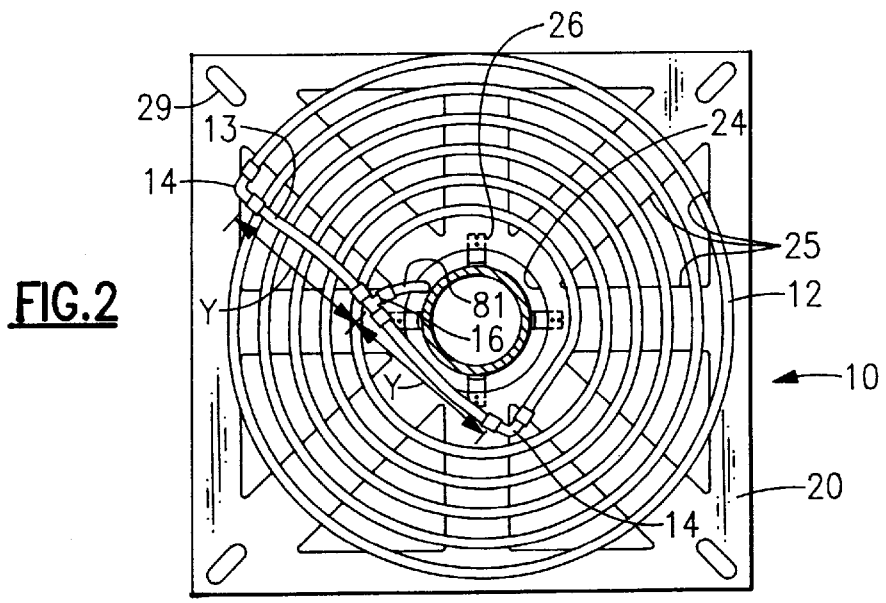
FIG.2

AERATION DEVICE

FIELD OF THE INVENTION

The present invention relates to aeration of liquids, and more particularly, to an improved aeration device that combines a fine bubble diffusion aerator with a "pot" aerator for cleaning a body of dirty, polluted or waste water.

BRIEF DESCRIPTION OF THE PRIOR ART

It is well known in the field that bodies of water require oxygen to support aquatic life and to decompose organic matter such as solid waste and dead aquatic organisms. Stagnant bodies of water can become oxygen-deficient and polluted and produce foul odors. Aeration devices are often used in an attempt to clean dirty, polluted or waste water by introducing oxygen into the water. Aerators are placed in the water body, with air feed lines that run back to shore where they are connected to a forced air source such as a compressor. Aerators typically introduce air bubbles into the water body at or near its bottom, so the air bubbles transfer oxygen to the water as the bubbles rise to the surface of the water. For a given air volume rate, small air bubbles provide a more efficient air/water transfer than do large bubbles, because many small bubbles provide more surface area for air/water transfer than do a few large bubbles. Additionally, air/water transfer efficiency is increased by maintaining a continuous supply of oxygen-deficient water to the air bubble outlet area of the aeration device.

Generally, there are two methods of aeration, "pot" aerators and fine bubble diffusion. "Pot" aerators are generally used for waste-water treatment, because EPA regulations specify an "air input"volume and a large "air input" volume can be most easily attained by employing "pot" aerators. "Pot" aerators are simple devices that generally have a hollow vertical pipe mounted on a base, with an air feed line having one large air outlet hole inside the pipe producing a column of large air bubbles exiting from the top of the pipe. Typical "pot" aerators are disclosed in U.S. Pat. No. 4,279,537 to Tweedy and U.S. Pat. No. 4,780,217 to Peterson. "Pot" aerators function well at mixing up bottom sludge and sediment and creating water movement, and provide some minimal air/water transfer. The problem with "pot" aerators is they are not very efficient at air/water transfer because of the large bubble size, and they are very costly to operate because they must run continuously to achieve even minimal air/water transfer.

Fine bubble diffusion systems are generally used for agricultural applications and other applications where large "air input" requirements do not apply. Fine bubble diffusion introduces much smaller air bubbles into the water through a plurality of much smaller air hole outlets, thereby providing a more efficient air/water transfer. Fine bubble diffusion systems generally are on the order of ten times more efficient at air/water transfer than "pot"aerators.

One known fine bubble diffusion system has multiple lengths of perforated hose laid across the bottom of a water body in a grid-like fashion, similar to the yard lines on a football field. There are several problems with this system. The air holes inevitably get clogged with sludge and sediment from being on the bottom of the water body. Because of the necessarily long lengths of the tubing across the width of the water body, the air pressure is low and not very uniform, making it very difficult to unclog the holes by forced air. Installation and/or replacement of hose sections is time-consuming and costly, requiring the on-site measurement and cutting of hose. Furthermore, the hose does not have access to a continuous supply of oxygendeficient water because the hose is lying on the water body bottom, so the air/water transfer efficiency is lessened.

Another known fine bubble diffusion system has coils of perforated tubing mounted on a frame and lying on the bottom of a water body. Because the bubble diffuser lies on the water body bottom, it suffers from the same air hole clogging problems and lack of a continuous oxygen-deficient water supply as the "grid" system described above. The bubble diffuisers are sometimes placed on concrete slabs to lessen the problem of clogging from bottom sludge and sediment, but the air/water transfer efficiency still suffers from the lack of a continuous oxygen-deficient water supply. A coiled tubing system has not been accomplished with adequate support at an elevated position to remedy this problem.

Another fine bubble diffusion system, having coils of perforated tubing mounted inside water holding vessels, is disclosed in U.S. Pat. No. 4,663,089 to Lowry. This system has several problems. The system operates on low air pressure, necessitating larger tubing perforations for creating air bubbles and thereby reducing the air/water transfer efficiency. The tubing perforations are located on only the top surface of the tubing, thereby requiring more tubing length to introduce a given amount of oxygen than if multiple rows of perforations were provided. The tubing perforations are holes, which allow a backflow of water into the tubing when the system is not operating. This can cause sludge and small particles suspended in the water to build up inside the tubing and clog the tubing and holes. Because the system operates on low pressure, it is difficult to unclog the system by forced air. Because the diffusion stage is contained within a water holding vessel, it is difficult to access the tubing for maintenance or repair. The perforated tubing can be fed from one end by one air feed line, but the resulting air pressure along the length of the tubing is not uniform, thereby reducing the effectiveness and efficiency of the system. To achieve uniform air pressure, the system requires multiple air feed lines, and each air feed line must be run all the way back to the air compressor manifold to reduce pressure loss and provide a sufficient air pressure to the tubing. Furthermore, the system is very complex and costly to install and operate, relative to more conventional fine bubble diffusion systems. A coiled tubing system has not been accomplished to remedy these problems, with slit perforated tubing on a free-standing support and with the tubing receiving substantially uniform air pressure provided by one air feed line.

Another fine bubble diffusion system is disclosed in U.S. Pat. No. 4,622,139 to Brown. This system has a manifold with rigid elongated micro porous diffuser tubes mounted above a base plate. This device is problematic because it has fine holes in the diffuser tubes which are especially susceptible to clogging, because the very small size of the holes makes it much easier for the holes to clog when the device is not operating. The holes also allow a backflow of water into the diffuser tubes, which can result in the expansion of freezing water causing damage to the rigid tubes in severe winter climates. Also, the elongated diffuser tubes are air fed from one end, so the air pressure along the length of the tubes is not very uniform and efficiency is reduced.

SUMMARY OF THE INVENTION

In accordance with the present invention, there is provided an aeration device comprising a fine bubble diffuser ("diffuser unit") mounted onto a "pot" aerator ("aerator unit"). The diffuser unit comprises a spiral coil of perforated flexible tubing mounted on a frame. An air feed line to the coiled tubing is connected to the coiled tubing so as to provide fairly uniform air pressure along the length of the coiled tubing. The air feed line is connected at the midpoint of a section of tubing connecting the ends of the coiled tubing. In another embodiment, the air feed line is connected directly to the coiled tubing at the midpoint of the coiled tubing. Furthermore, in either embodiment the length of perforated tubing per head is minimized relative to other systems such as the "grid" system, reducing the pressure drop and thereby increasing the air pressure at the diffuser air outlet holes.

The tubing perforations are comprised of substantially evenly spaced slits on the top and side quadrant surfaces of the tubing. The slits do not allow water to backflow into the tubing, and are much less susceptible to clogging than the holes provided in other devices. Perforations are provided on the top and side quadrant surfaces of the tubing surface to increase the number of air bubbles and therefore the amount of air/water transfer.

The diffuser unit frame has a plurality of openings, to allow a continuous supply of oxygen-deficient water to flow across the diffuser unit tubing and thereby increase air/water transfer. The frame openings also make installation easier by reducing hydroplaning of the frame surface when lowering the aeration device into the water body.

The aerator unit comprises a hollow vertical pipe with an air feed line outlet inside the pipe. The diffuser unit is mounted onto the aerator unit vertical pipe, whereby the diffuser unit is elevated off the bottom of the water body to reduce stirring up of bottom sediments and clogging of the diffuser air holes, and to increase the flow of oxygen-deficient water across the diffuser unit tubing to increase air/water transfer. The diffuser unit can be mounted onto a vertical pipe without an air feed line where an aerator unit is not required, and still gain the benefits of less clogging and more oxygen-deficient water.

The diffuser unit and the aerator unit each have a separate air feed line so that they can be operated independently. Thus, the diffusion unit can be run for maximum air/water transfer, the aerator unit can be run for maximum water movement, or both can be run to maximize the benefits of each unit.

The air feed line ends are embedded into the base of the stand. Air feed line connectors extend from the base for ease of hook-up during installation. The air lines are thus secured in place and less susceptible to damage from debris floating in the water body.

The diffuser unit and the aerator unit are provided as completed assemblies for ease of installation and/or replacement. During an installation, a completed diffuser unit assembly is mounted onto a completed aerator unit assembly, the air feed lines are connected, and the entire unit is lowered into the water body. Replacement of a diffuser unit assembly is accomplished by simply disconnecting the air feed line at the coiled tubing, disconnecting the diffuser unit frame mounting means, and lifting the diffuser unit up off the aerator unit.

These and other features of the present invention are discussed or apparent in the following detailed description.

BRIEF DESCRIPTION OF THE DRAWINGS

The various features and advantages of the invention will be apparent from the attached drawings, in which:

FIG. 1 is a perspective view of the aeration device showing a diffuser unit mounted on an aerator unit, each having a separate air feed line;

FIG. 2 is a plan view of the diffuser unit, showing spiral coiled tubing mounted on a frame, with a section of tubing connecting the ends of the coiled tubing, and an air inlet connector connected to the midpoint of the section (at a point of "Y" distance from the ends of the section);

FIG. 3 is a detail view of the perforated tubing with an air inlet connector, with perforated slits on the top and side surfaces of the tubing;

DETAILED DESCRIPTION OF THE PREFERRED EMBODIMENT

Figure 6:
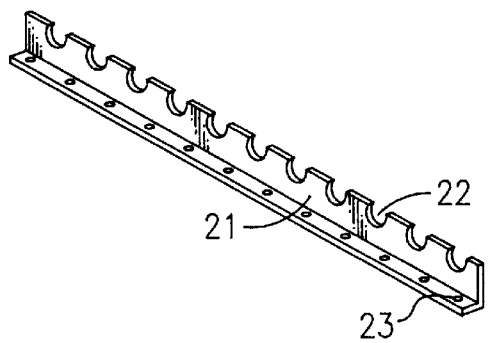
FIG. 6 is a perspective view of the tubing mounting means provided by flanged support brackets with circular cross-section tubing inserts.

Referring now to FIG. 1, there is illustrated a diffuser unit 10 mounted on an aerator unit 80, which is mounted on a base 90. The diffuser unit 10 comprises a spiral coil of perforated flexible tubing 12 mounted on a frame 20. The spiral configuration is provided by multiple turns of increasing radius of flexible tubing 12.

The tubing 12 is made of a flexible, synthetic, non-deteriorating material such as polyethylene. Tubing perforations provided as slits 13 (see FIG. 3) are preferable to holes because slits substantially seal closed when the aeration device is not operating, thereby preventing a backflow of water into the tubing. Rows of substantially evenly distributed slits 13, on the top 18 and side 19 quadrant surfaces of the tubing, are preferable to increase the amount of air introduced per length of tubing, without introducing such a high density of air bubbles that the bubbles aggregate into larger bubbles and reduce air/water transfer efficiency.

The tubing 12 is commercially available in reels of ⅝" tubing with die cut slits on three sides/quadrants of the tubing. The tubing diameter is sized based on the air pressure desired, and ⅝" tubing is preferable, though other sizes may also work well. The tubing length is sized based on the air volume desired (greater length provides a greater number of slits/bubbles) and physical size and weight considerations, and 100' of tubing is preferable, though other lengths may also work well. The tubing slit length is sized based on a balance of the air volume desired (greater slit length provides a larger size of bubbles) and the air/water transfer efficiency desired (smaller slits/bubbles provides greater efficiency), and approximately ½" slit lengths are preferable, though other slit lengths may also work well. Multiple rows of slits in the tubing provide greater air volume (greater number of bubbles), and slits on three surfaces is preferable, though other slit arrangements may also work. The tubing diameter and length and number of slits are not critical because additional aeration devices can be installed to introduce additional oxygen into the water body.

In the preferred embodiment (see FIG. 2), a length of tubing 13 is connected to the ends of the coiled tubing 12 by two "el" PVC pipe connections 14. A "T" PVC pipe diffuser air inlet connector 16 is installed at the midpoint of the length of tubing (at a distance "Y" from the ends of the length of tubing), thereby providing an approximately equal air pressure to each coiled tubing end. Because the coiled tubing is air fed from both ends with approximately equal pressure, a fairly uniform air pressure is provided along the length of the coiled tubing.

Figure 5:
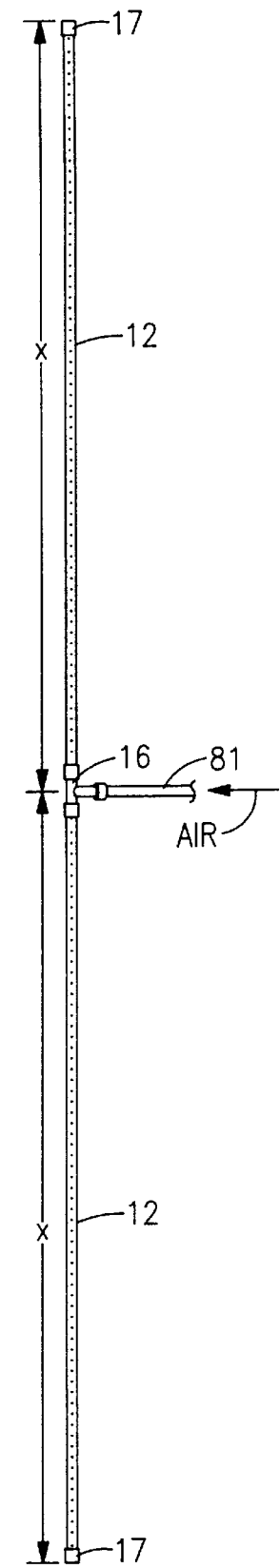
FIG. 5 is a detail view of the tubing shown in FIG. 4, in an uncoiled position, showing an air inlet connector connected to the tubing at the midpoint of the length of tubing (at a point of "X" distance from the ends of the length of tubing)
Figure 4:
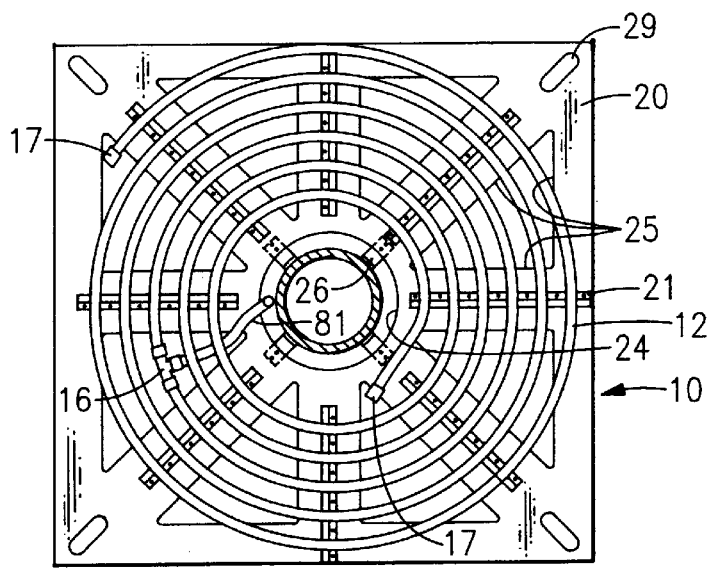
FIG. 4 is a plan view showing another embodiment of the diffuser unit, with an air inlet connector connected to the tubing at the midpoint of the length of tubing.

In another embodiment (see FIG. 4), the ends of the coiled tubing 12 are plugged 17 and a "T" PVC pipe diffuser air inlet connector 16 is installed at the midpoint of the coiled tubing (see FIG. 5, the midpoint being a distance "X" from the ends of the tubing when it is uncoiled). Because the coiled tubing is air fed from the midpoint of the tubing length, a fairly uniform air pressure drop is achieved from the midpoint to each end of the length of the coiled tubing. Multiple air inlet connectors may be connected to the coiled tubing at various locations, and split off from one air feed line or fed by multiple parallel air feed lines, to provide a more uniform air pressure along the length of the coiled tubing.

The coiled tubing 12 is attached to the frame 20 by a tubing mounting means, such as stainless steel flanged support brackets 21 (see FIG. 6). The support brackets 21 have a top edge with circular cross-section tube inserts 22 for receiving and securing the coiled tubing 12. The tube inserts 22 are substantially evenly spaced on the support brackets 21, so that the turns of spiral coiled tubing 12 are substantially evenly spaced. The support brackets 21 have a flanged bottom 23 for attaching, such as by stainless steel rivets or bolts, to the frame 20. Each support bracket 21 is approximately 2' long with eleven tube inserts 22 to accommodate the 100' length of spiral coiled tubing 12.

The frame 20 is substantially planar and made of PVC, fiberglass, or another non-deteriorating material. The frame 20 is approximately 4' by 4' square to provide for adequate spacing of 100' of spiral coiled tubing 12. The frame may also be approximately 4' diameter round. The frame 20 has a circular center opening 24 sized to provide about 1" clearance between the stand 80 and the frame center opening 24 for running the diffuser air feed line 85. Eight triangular off-center openings 25 are cut into the frame 20. The openings 25 lessen hydro-planing of the frame during installation when the aeration device is lowered into the water body, and allow a continuous supply of oxygen-deficient water to be drawn across the tubing 12 by the upward air bubble flow, thereby increasing air/water transfer efficiency.

Turning now to the aerator unit (see FIG. 1), the vertical pipe 80 is standard 8" or 12" diameter PVC pipe, of 6' or 8' length, any combination of these working well. The length of the pipe is not critical, although at least a few feet of vertical pipe are preferred to allow the diffuser unit to be mounted up off the water body bottom. Also, at least several feet of water are preferred above the top of the vertical pipe to allow air bubbles to travel some distance to the surface to provide air/water transfer.

An aerator feed line 81 is provided, such as 1" PVC pipe, with one end inside the vertical pipe 80 having an end cap 82 and an aerator outlet hole 83 of a diameter such as ⅛". A water inlet opening 84 is cut into the vertical pipe 80 below the aerator outlet hole 83 to allow water to be drawn up into the vertical pipe 80 by the ascending aerator air bubbles. The water inlet opening 84 is best located at least a little above the base 90 to minimize stirring up of the bottom sludge and sediment, thereby providing an anaerobic zone below the water inlet. The water inlet opening 84 is best located at least a little below the diffuser unit 10 so the diffuser unit and the aerator unit can each draw a continuous supply of oxygen-deficient water.

The frame 20 is mounted to the aerator unit vertical pipe 80 by frame mounting means, such as stainless steel "L" brackets 26 (see FIG. 2). The "L" brackets 26 are secured to the frame 20 and the vertical pipe 80 by stainless steel bolts, which can be easily attached and removed. Due to the high air pressure during operation, the frame may need additional support for stability. Additional support for the frame 20 may be provided by tension supports 29, made of rope, wire, or another material with tensile strength. Rope supports may be installed through holes cut into the frame and the vertical pipe, with knotted ends to secure the rope ends in place.

The frame 20 should be mounted to the vertical pipe 80 some distance above the base 90, to prevent stirred up sludge and sediment from clogging the diffuser air outlet perforations 13, and to provide for a continuous supply of oxygen-deficient water to be drawn across the tubing 12 by the upward air bubble flow, thereby increasing air/water transfer efficiency. The frame 20 may be mounted to the vertical pipe 80 so the top of the pipe extends some distance above the frame, or so the pipe does not extend through the frame.

In one embodiment, the diffuser unit 10 can be mounted onto a vertical pipe 80 without an aerator air feed line 81 where an aerator unit is not required. The vertical pipe thus provides an elevated diffuser unit position with the benefits of less clogging and more oxygen-deficient water.

A diffuser air feed line 85 of PVC or tubing is connected to the diffuser air inlet connector 16. The diffuser air feed line 85 and the aerator air feed line 81 may be secured to the aerator unit vertical pipe 80 by means such as straps around the vertical pipe.

The base 90 is made of concrete to provide weight for stability. The diffuser air feed line 85 and the aerator air feed line 81 each have their lowers sections 91, 92 embedded into the concrete base 90 to provide for stability and to lessen the chance of the feed lines getting damaged by any debris in the water body. The diff-user air feed line 85 and the aerator air feed line 81 each have a feed line connector 93, 94 extending from the top of concrete base 90, for ease of hook-up during installation.

The diffuser unit 10 and the aerator unit and base 80, 90 can be shipped as two complete assemblies to conserve space in transport. Only minimum on-site assembly is required, specifically, sliding the diffuser unit 10 onto the aerator unit vertical pipe 80, securing the frame mounting brackets 26, and connecting the diffuser air feed line 85 to the diffuser air inlet connector 16. The diffuser unit assembly can be relatively easily removed and replaced by reversing this procedure. All components are made of non-deteriorating material, such as polyethylene, PVC and stainless steel, to minimize that likelihood of having to replace components.

Generally, multiple aeration devices are installed in a water body as a system. The aeration devices are driven by compressed air through air feed lines run along the water body bottom and attached to the aeration devices, as is well known in the field. The systems can be provided with timers and other controls on shore with the air compressor(s). The diffuser unit and the aerator unit have separate air feed lines and are valved separately, providing operational flexibility. The aerators can be operated independently, running only the diffusion unit for air/water transfer, running only the aerator unit to create water movement, or running both to maximize the benefits of each aerator. This operational flexibility provides for increased effectiveness and efficiency in a variety of applications.

During warm weather, optimal effectiveness and efficiency is achieved by running the aerator unit for about two hours per day to create water movement, and running only the diffuser unit for the rest of the day. This results in energy saving of approximately 40% relative to running a conventional pot aerator. After running the aeration device for a few hours after installation, even a body of waste water looks and smells significantly cleaner.

During cold weather, optimal effectiveness and efficiency is achieved by running the diffuser unit only and leaving the aerator unit off Running the diffuser unit provides the water with sufficient oxygen. Leaving the aerator unit off so no water movement is created preserves the water body bottom temperature and temperature stratification. This allows the bottom sludge to stay "alive" during the winter, so there is not as much dead smelly matter rising to the surface in the spring when the water warms.

It will be appreciated that this application covers all such embodiments and modifications that fall within the true scope and spirit of the claims provided hereinafter.

What is claimed is:

1. An aeration device comprising:
   a diffuser unit having a spiral coil of perforated tubing with an air inlet connector, a frame having an opening therethrough and a top surface, and tubing mounting means for attaching said tubing to said top surface;
   an aerator unit having a hollow vertical member and an air feed line, said vertical member extending through said frame opening and having an open upper end and a lower end, said air feed line having an air outlet end within said hollow vertical member and an air inlet end;
   frame mounting means for removably attaching said frame to said vertical member; and
   a base mounted to said lower end of said vertical member.

2. An aeration device in accordance with claim 1 in which said perforated tubing has an outer end and an inner end, and further comprising a second length of tubing having one end connected to said outer end and another end connected to said inner end, and having said diffuser air inlet connector connected to said second length of tubing at the approximate midpoint of said second length.

3. An aeration device in accordance with claim 1 in which said perforated tubing has a length and two sealed ends, and said air inlet connector is connected to said perforated tubing at the approximate midpoint of said length.

4. An aeration device in accordance with claim 1 in which said tubing has an upper surface and two side surfaces, and said tubing perforations are through said upper and side surfaces.

5. An aeration device in accordance with claim 1 in which said tubing perforations are comprised of a plurality of slits.

6. An aeration device in accordance with claim 1 in which said aerator air feed line has a lower section with an end, said lower section embedded into said base and said lower section end extending from said base.

7. An aeration device in accordance with claim 1 further comprising a diffuser air feed line having an upper section with an end and a lower section with an end, said upper end removably attached to said diffuser air inlet connector, and said lower section embedded into said base and said lower section end extending from said base.

8. An aeration device in accordance with claim 1 in which said frame has a plurality of off-center openings therethrough.

9. An aeration device comprising:
   a diffuser unit having a spiral coil of perforated tubing with an air inlet connector, a frame having a surface, and tubing mounting means for rigidly attaching said tubing to said surface;
   a vertical stand having an upper end and a lower end;
   frame mounting means for removably attaching said frame to said upper end of said vertical stand; and
   a base mounted to said lower end of said vertical stand.

10. An aeration device in accordance with claim 9 in which said stand comprises a hollow vertical member, and further comprising an aerator air feed line having an air outlet end within said hollow vertical member and an air inlet end.

11. An aeration device in accordance with claim 9 in which said perforated tubing has an outer end and an inner end, and further comprising a second length of tubing having one end connected to said outer end and another end connected to said inner end, and having said diffuser air inlet connector connected to said second length of tubing at the approximate midpoint of said second length.

12. An aeration device in accordance with claim 9 in which said perforated tubing has a length and two sealed ends, wherein said air inlet connector is connected to said perforated tubing at the approximate midpoint of said length.

13. An aeration device comprising:
   a diffuser unit having a spiral coil of flexible tubing with slit perforations and an air inlet connector, a substantially planar frame having a center opening therethrough, a plurality of off-center openings therethrough, and a top surface, and tubing mounting means for rigidly attaching said tubing to said top surface;
   an aerator unit having a hollow vertical member and an air feed line, said vertical member extending through said frame center opening and having an open upper end, a lower end, and a sidewall with an opening therethrough, said air feed line having an air outlet end within said hollow vertical member and an air inlet end;
   frame mounting means for removably attaching said frame to said vertical member; and
   a weighted base mounted to said lower end of said vertical member.

14. An aeration device in accordance with claim 13 in which said tubing mounting means comprises flanged support brackets having generally circular crosssection openings therethrough.

15. An aeration device in accordance with claim 13 in which said frame mounting means comprises a plurality of "L" brackets.

16. An aeration device in accordance with claim 13 in which said frame has an outer edge portion, and further comprising tension supports having an end attached to said frame outer edge portion and another end attached to said vertical member upper end.

17. An aeration device in accordance with claim 13 in which said tubing has an upper surface and two side surfaces, and said tubing perforations are substantially evenly distributed along said upper and side surfaces.

18. An aeration device in accordance with claim 13 in which said perforated tubing has an outer end and an inner end, and further comprising a second length of tubing having one end connected to said outer end and another end connected to said inner end, and having said diffuser air inlet connector connected to said second length of tubing at the approximate midpoint of said second length.

19. An aeration device in accordance with claim 13 in which said perforated tubing has a length and two sealed ends, and said air inlet connector is connected to said perforated tubing at the approximate midpoint of said length.

20. An aeration device in accordance with claim 13 in which said aerator air feed line has a lower section with an end, said lower section embedded into said base and said lower section end extending from said base; and further comprising a diffuser air feed line having an upper section with an end and a lower section with an end, said upper end removably attached to said diffuser air inlet connector, and said lower section embedded into said base and said lower section end extending from said base.

* * * * *